United States Patent

[11] 3,572,914

[72] Inventors: Roger Piola, Geneva; Andre Guenin, Petit Lancy, Geneva; Conrad Zellweger, Chene-Bougeries, Geneva, Switzerland
[21] Appl. No. 788,751
[22] Filed Jan. 3, 1969
[45] Patented Mar. 30, 1970
[73] Assignee La Nationale S. A. Geneva, Switzerland
[32] Priority Jan. 4, 1968
[33] Switzerland
[31] 83/1968

[54] ARRANGEMENT FOR HINGING A SIDEPIECE TO THE LENS BOW OF A SPECTACLES FRAME
12 Claims, 7 Drawing Figs.
[52] U.S. Cl. ................................................ 351/113
[51] Int. Cl. ................................................ G02c 5/6
[50] Field of Search ................................................ 351/113; 267/71

[56] References Cited
UNITED STATES PATENTS
3,034,402  5/1962  Alberetti ..................... 351/113

Primary Examiner—David Schonberg
Assistant Examiner—Robert L. Sherman
Attorneys—Albert C. Johnston, Robert E. Isner, Lewis H. Eslinger and Alvin Sinderbrand ABSTRACT: A hinge pin connecting together a hinge member fixed to the lens retaining portion and a hinge member resiliently connected to a temple is constrained so to move that the temple outer corner pressing against the lens retaining portion substantially serves as the virtual pivoting axis for the temple.

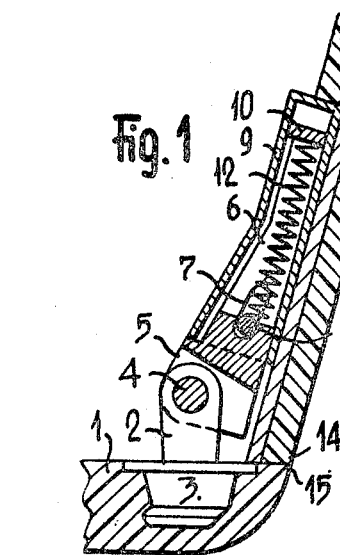
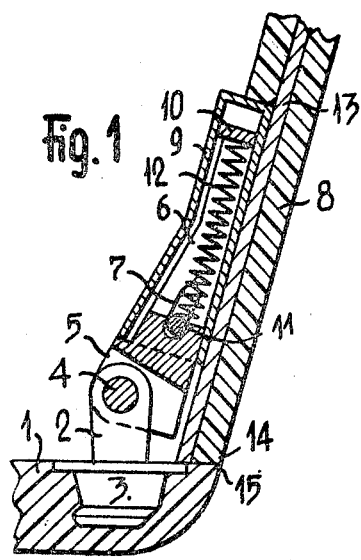
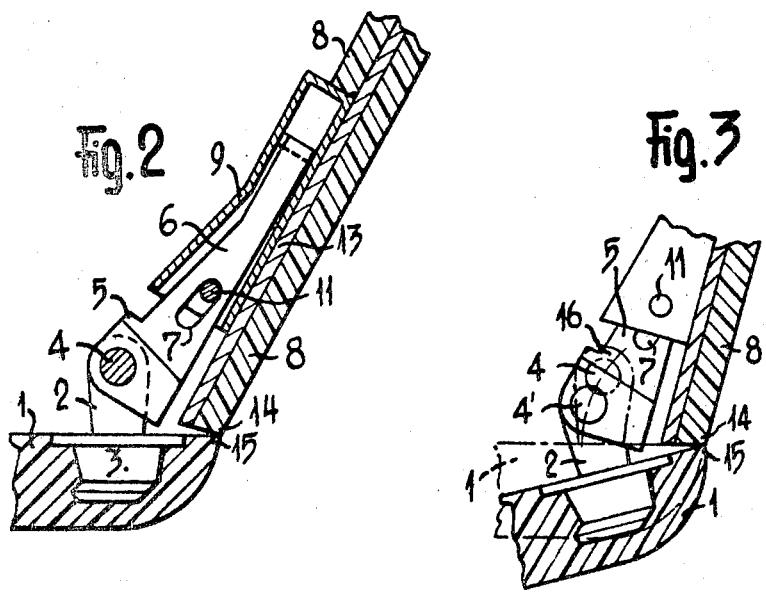
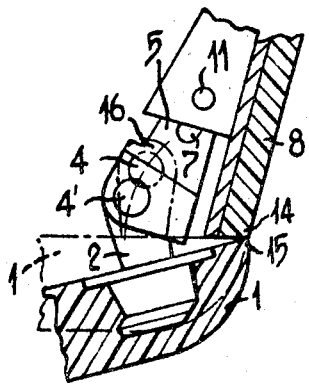
INVENTORS
ROGER PIOLA
ANDRE GUENIN
CONRAD ZELLWEGER
BY Lewis H. Eslinger
ATTORNEY

PATENTED MAR 30 1971

INVENTORS
ROGER PIOLA
ANDRE GUENIN
CONRAD ZELLWEGER

BY
ATTORNEY

ARRANGEMENT FOR HINGING A SIDEPIECE TO THE LENS BOW OF A SPECTACLES FRAME

Among the hinging arrangements for spectacles frames are those incorporating a first hinge member rigidly fixed to the lens retaining portion and a second hinge member pivotally connected to the first and resiliently connected to the temple by a guide arrangement.

In constructions of this kind, a temple can be opened without the appearance of any resilient force until the forward end of the temple begins to press against the lens retaining portion. From this position on, any further opening of the temple must be made against the resilient force of the hinging arrangement. During this further movement of the temple, the point at which the temple pivots about the hinge member rigidly fixed to the lens retaining portion moves with respect to the temple and follows a direction substantially parallel to the latter. Since the pivoting point does not coincide with the outer side of the temple, the result is that, as the temple pivots, the point of contact between the temple and the lens retaining portion moves with respect to the latter. Thus, when a temple is opened to the maximum, its forward outer corner no longer is aligned and in contact with the neighboring edge of the lens retaining portion, thereby giving rise to the false impression that the hinge was carelessly mounted.

The purpose of the invention is to provide a hinging arrangement that avoids this shortcoming.

An object of the invention is an arrangement for so hinging a temple to the corresponding lens retaining portion of a spectacles frame that the temple outer corner pressing against the lens retaining portion when the temple is opened substantially serves as the virtual pivot axis for the temple.

The invention will be described, with reference to the FIGS. of the drawings, wherein:

FIG. 1 is a top view, in cross section, of the hinging arrangement of the invention, the temple opened to the maximum position at which no resilient force is felt;

FIG. 2 is a top view, in cross section, showing the hinging arrangement illustrated in FIG. 1 at maximum opening;

FIG. 3 is a top view, in cross section, showing the movement of the fixed hinge member when the temple is moved from the position of FIG. 1 to that of FIG. 2;

Figure 4:
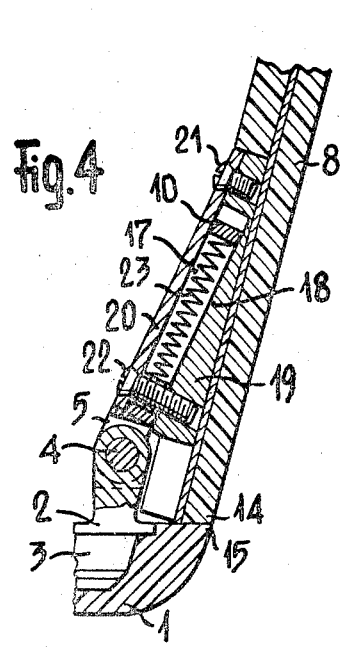
Figure 5:
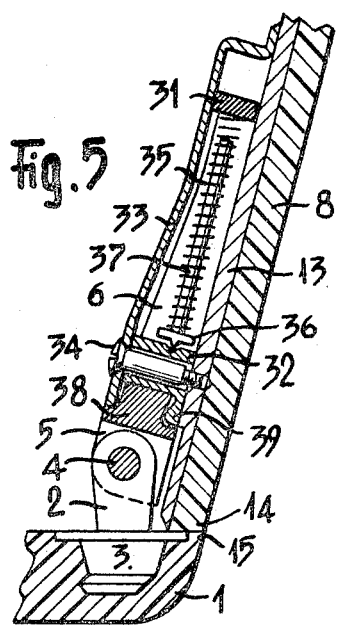
Figure 6:
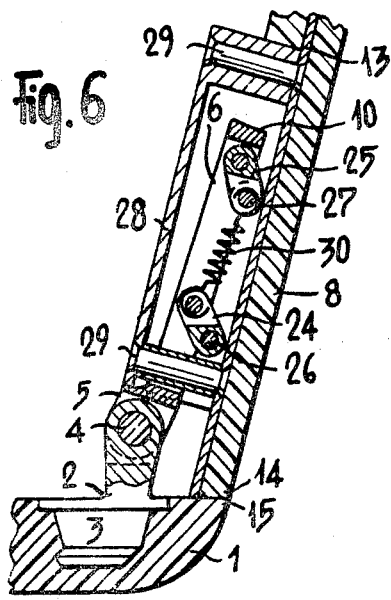
Figure 7:
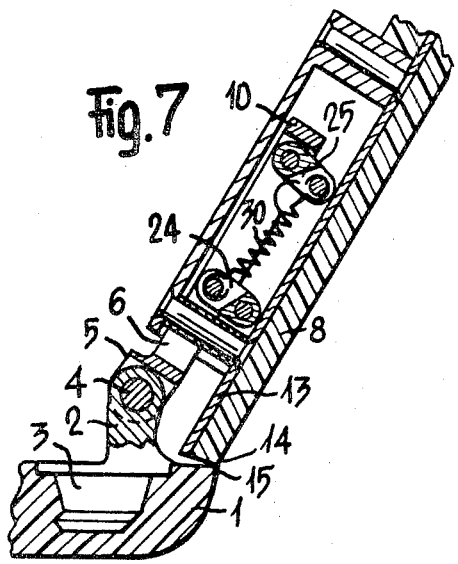

FIGS. 4 and 5 are top views, in cross section, respectively showing second and third embodiments of the invention; and FIGS. 6 and 7 show a fourth embodiment in the two opened positions respectively corresponding to those of FIGS. 1 and 2.

In the embodiment of the invention, shown in FIGS. 1 to 3, a spectacle frame, of which only part of the lens retaining portion 1 and the temple 8 are illustrated, has a hinge member 2 rigidly fixed to the lens retaining portion 1 by a pin 3 embedded into the lens retaining portion. The hinge member 2 carries a pin 4 that pivotally mounts a second hinge member 5 having an armlike extension 6 and a slot 7.

The second hinge member 5 is resiliently connected to the frame temple 8 by a guide arrangement comprising a hollow part 9 in which the extension 6 is free to slide. The end 10 of the extension slides in that part of the hollow part 9 which has parallel sidewalls.

The guide arrangement also comprises a transverse rod 11 carried by the part 9, the rod serving to hold a compression spring 12, the other end of which presses against a transverse foot forming the end 10 of the extension 6.

The hollow part 9 can be fixed to the temple 8 in any suitable way. One particularly suitable way is to solder or weld it to the metal reinforcement 13 of the temple 8.

The spring 12 keeps the extension 6 inside of the hollow part 9 in a position defined by the stop made by one end of the slot 7 and the transverse rod 11. When the wearer opens the temple 8 to the position shown in FIG. 2, the extension 6 moves with respect to the hollow part 9 towards the open end of the latter and against the force of the spring 12. During this movement, the outer corner 14 of the front face of the end of the temple 8 pivots while remaining practically aligned with the edge 15 of the lens retaining portion 1.

FIG. 3 schematically shows the position of the pin 4 with respect to the temple 8 for two positions respectively corresponding to FIGS. 1 and 2, the temple 8 appearing as though it were stationary and the lens retaining portion 1 occupying two different positions. In the position corresponding to that of FIG. 1, the lens retaining portion 1, the hinge member 2, and the pin 4 are shown in dot-dash line. In the position corresponding to that of FIG. 2, the pin 4 is now given the reference number 4', and the lens retaining portion 1 is drawn in solid line. The FIG. 3 shows that the hinge pin 4 moves with respect to the temple 8, parallel to itself, and substantially tangent to a circular cylinder 16 having its axis coincident with the corner 14 of the outer edge of the side 8. This corner thus practically constitutes a virtual pivoting axis between the temple 8 and the lens retaining portion 1.

In the first form of the invention, the hinge pin 4, as it moves, remains substantially tangent to the surface of the cylinder 16, but it does not exactly follow this surface; instead, it moves along a line the curve of which is opposite to that of the cylinder.

FIG. 4 shows a second embodiment, in which the second hinge member 5 incorporates a slotted extension 17 mounted free to slide in a groove 18 of a part 19 fixed to the temple 8. This groove is closed by a side cover 20 held by two screws 21 and 22. A compression spring 23 presses at one end against a sleeve surrounding the screw 22, and at its other end against a foot that forms the end of the extension 17, so that the extension is pushed towards the upper end (as seen in FIG. 4) of the groove 18. In this embodiment, the pin 4 moves along a line substantially tangent to a circular cylinder having an axis coincident with the corner 14.

The third embodiment, shown in FIG. 5, operates in substantially the same way as the form shown in FIGS. 1 to 3. With respect to this latter form, the lens retaining means 1 and the hinge member 2 are unchanged. The second hinge member 5, which turns on pin 4, embodies an extension 6 composed of two parallel, vertically spaced arms connected together by a transverse end piece 31. These two arms are positioned on respective upper and lower sides of a crosspiece 32 positioned between the inner face of a side cover 33 and the metallic reinforcement 13 of the temple 8. A screw 34 fixes the side cover 33 to the reinforcement 13.

The second hinge member 5 is biased to the position shown in FIG. 5 by a compression spring 35, one end of which presses against the end piece 31 and the other end against the head 36 of a guide pin 37, which latter at its other end serves as a stop for the end piece 31, to limit the extent to which the temple 8 can be opened.

When the temple 8 is opened wider than is customary, the second hinge member 5 moves against the force of the spring 35, the path that this movement follows with respect to the temple 8 being determined by the transverse end piece 31, which slides between the parallel respective faces of the reinforcement 13 and the cover 33, and by the end 38 of the extension 6, which is next to the pin 4. The end 38 moves between the end of the cover 33 and a projection 39 of the crosspiece 32. Here, as in the previous embodiments, the movement of the pin 4 is parallel to itself and, with respect to the temple 8, is substantially tangent to a cylinder of which the axis coincides with the corner 14 of the side 8.

If all movement between the corner 14 and the frame edge 15 is to be eliminated, the movement of the pin 4 with respect to the temple 8 must follow a circular arc centered at the corner 14.

This requirement is virtually fulfilled by the embodiment illustrated in FIGS. 6 and 7. In this form, the guide arrangement for the second hinge member 5 includes two links 24 and 25 pivotally mounted on respective axles 26 and 27, which are rigidly held by a small housing 28 fixed to the reinforcement 13 by two rivets 29. A respective further axle (not referenced) pivotally connects each link to the second hinge member 5.

These two links constitute a distorting articulated parallelogram which ensures, for the short path of movement that the hinge member 5 is free to move with respect to the temple 8, that the movement of the pin 4 very closely approximates a circular arc centered at the corner 14.

The resilient restoring force is produced by a spring 30 connected at one end to the fixed axle 27 and at its other end to the second hinge member 5 by means of the axle that pivotally mounts the cam 24 on the member 5.

The specialist in the art will understand that the pin 4, in the embodiment of FIGS. 1 to 3, can also be made to move along a circle centered at the corner 14, by suitably shaping the slot 7, so that its edges act as a cam to determine the path along which the extension 6 moves with respect to the temple 8.

Although the preferred embodiments of the invention have been described, the scope of, and the breadth of protection afforded to, the invention are limited solely by the appended claims.

We claim:

1. An arrangement for hinging a temple to the lens retaining portion of a spectacle frame including, a first hinge member rigidly connected to said lens retaining portion, a second hinge member, and a hinge pin connecting said first and second hinge members for relative pivotal movement only, between the fully closed and fully opened positions thereof, connecting means for operatively connecting said second hinge member to said temple comprising an elongated hollow member rigidly mounted on said temple, an extension formed on said second hinge member and extending into said hollow member, means for guiding said extension for movement relative to said temple along a path substantially parallel to said temple including an elongated slot formed in said extension intermediate its ends and guide means rigidly mounted in said hollow member and extending through said slot for operative engagement with at least one end of said slot, and resilient means in said hollow member operatively engaged with said extension for urging said one end of the slot into engagement with said guide means, whereby said temple is adapted to be pivoted about said hinge pin with respect to said lens supporting portion from the fully closed position thereof to an intermediate position wherein the outer corner of said temple engages said lens retaining portion, and from said intermediate position to said fully opened position wherein said hinge pin moves parallel to itself and with respect to said temple along a path such that said temple outer corner defines the pivot axis of said temple and remains engaged with said lens retaining portion.

2. The hinge arrangement as defined in claim 1, wherein said guide means includes a crossmember rigid with respect to said temple and positioned between said hinge pin and a free end of said extension remote from said hinge pin, said arrangement further including, a guide pin having opposed ends extending partway between said crossmember and said extension free end when said temple is opened to said intermediate position, said guide pin having a head at one end in permanent contact with said crossmember and the other end of said guide pin acting as a stop together with said extension free end, said resilient means being compressed between the head end of said guide pin and said extension free end to urge said one end of said slot into engagement with said crossmember.

3. The hinge arrangement as defined in claim 2, wherein said wherein said cross member includes a projection extending towards said hinge pin adapted to engage said second hinge member near said hinge pin to assist in guiding the movement of said hinge pin.

4. The hinge arrangement as defined in claim 1, wherein said guide means comprises a rod mounted in said hollow member extending transversely to the lengthwise direction of said temple and positioned between said hinge pin and a free end of said extension remote from said hinge pin, said resilient means being compressed between said rod and said extension free end, to urge said one end of said slot into engagement with said guide means, said slot being adapted to slide with respect to said rod between said intermediate and said fully open positions of said temple to determine the path along which said hinge pin moves.

5. The hinge arrangement as defined in claim 4, wherein said guide slot causes said hinge pin to move along a path substantially tangent to a circular cylinder with a center coincident with the outer corner of the temple.

6. The hinge arrangement as defined in claim 4, wherein said guide slot causes said hinge pin to move along a path that at least very closely approximates a circular arc centered at the outer corner of the temple.

7. The hinge arrangement as defined in claim 1, wherein said hollow member includes a generally triangularly shaped platform rigidly mounted adjacent said temple and defining a guide path along an acute angle with said temple in the lengthwise direction thereof for guiding said hinge pin along a path substantially tangent to a circular cylinder centered at the outer corner of said temple during movement of said temple between said intermediate position and said fully opened position.

8. The hinge arrangement as defined in claim 7, wherein said resilient means is positioned in compression, between said free end of said extension remote from said hinge pin and said guide means, to urge said one end of said slot into engagement with said guide means.

9. The hinge arrangement as defined in claim 1, including a distorting articulated parallelogram cooperating with said second hinge member extension to cause said hinge pin to move at least approximately along a circular arc centered at the outer corner of the temple.

10. The hinge arrangement as defined in claim 9, wherein said distorting articulated parallelogram includes first and second links spaced along said second hinge member extension, and pivot means for pivotally connecting a respective link to said second hinge member extension and to said hollow member.

11. The hinge arrangement as defined in claim 10, wherein said resilient means is connected between one of said pivot means connecting one of said links to said hollow member and another of said pivot means connecting the other of said links to said second hinge member extension.

12. The hinge arrangement as defined in claim 4, wherein said guide slot cooperates with said rod to determine the maximum extent to which the sidepiece can be opened.